Aug. 1, 1967   M. K. JURSCHAK   3,333,844

PRESSURE EXHALING EXERCISING DEVICE

Filed Aug. 17, 1964

INVENTOR.
MARY K. JURSCHAK
BY Hiram A. Sturges
Agent

United States Patent Office 3,333,844
Patented Aug. 1, 1967

3,333,844
PRESSURE EXHALING EXERCISING DEVICE
Mary K. Jurschak, 908 Maplecrest Drive,
Harlan, Iowa 51537
Filed Aug. 17, 1964, Ser. No. 389,872
3 Claims. (Cl. 272—57)

This invention relates to lung-exercising devices, and more particularly it is an object of this invention to provide a device into which an operator can blow for exercising the lungs.

Heretofore the lung exercise gained by the blowing of balloons has been recognized. However, when a balloon is being inflated, the pressure required for further filling an already expanded balloon is much greater than the pressure required in intermediate stages of the inflation, and it is more desirable that a lung patient be inflating a balloon against a regulatable and constant pressure, and it is an object of this invention to provide this possibility through the use of a pressure relief valve in the balloon inflating device of this invention for providing variable settings for releasing air from the balloon at a desired rate of speed.

A further disadvantage of blowing a balloon up through a common mouthpiece tube lies in the absence of a possibility for conveniently retaining the pressure in the balloon between successive intervals of blowing and during the time while the patient is breathing in air. It is, therefore, an object of this invention to provide a mouthpiece device for attachment to a balloon which has in it an automatically operating valve adapted to open during a blowing therethrough by a patient and adapted to close as a result of the back pressure from the balloon the moment that the blowing by the patient has ceased.

As the particular technique that will fit a given lung patient will vary, it is, for that reason, an object of this invention to provide a device for this purpose giving a wide range of variation possibilities in the relef valve back pressure adjustment feature.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1:
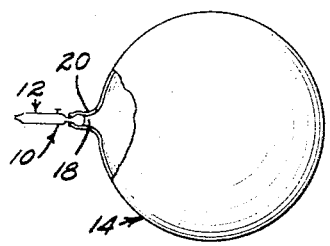
FIGURE 1 is a side elevation of the pressure exhaling lung exercising device of this invention showing a portion of the balloon section thereof broken away for purposes of illustration.

The pressure exhaling lung exercising device of this invention is generally indicated at 10 in FIGURE 1 and comprises a valving assembly generally indicated at 12 and balloon 14 of elastic resilient material which is adapted to be inflated and which is adapted to seek a deflated state because of its resiliency whenever pressure on the interior of the balloon through an opening 18 in the neck 20 of the ballon is relaxed.

Figure 2:
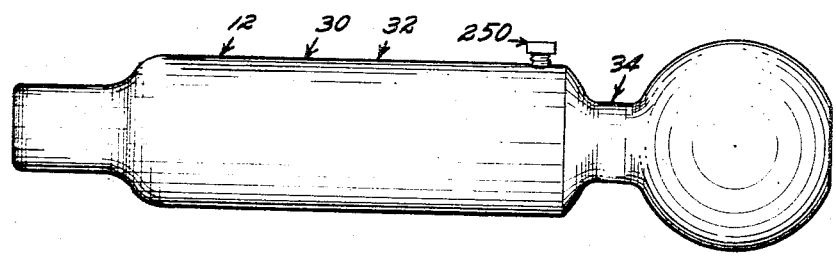
FIGURE 2 is a side elevation of the valving assembly of the device of FIGURE 1.

Referring to FIGURE 2, it will be seen that the valving assembly 12 has a housing assembly generally indicated at 30 comprising an input housing 32 and an output housing 34.

The input housing 32 has a chamber 40 therein and also has an input passage 42 extending from the outside of the input housing 32 to the chamber 40.

An annular valve seat 44 surrounds the input passage 42 and forms a part of the wall 46 of the chamber 40.

A valve 50 is provided in the chamber having a valve head 52 having an outer surface 56 adapted to seat against the valve seat 44 to close the input passage 42.

Preferably, the valve head surface 56 and the annular seat 44 are conical and frusto-conical respectively.

The valve 50 has an annular substantially closed guide sleeve 58 on the side of its valve head 52 which faces away from the valve seat 44, the guide sleeve 58 being attached to the valve head 52 in a manner for providing a caplike enclosure therewith. The output housing 34 has an output passage 60 therethrough extending from an outer end 62 inwardly, the output housing 34 having an inner end portion 66 forming an end of the chamber 40 and being secured to the input housing 32 by cement or other suitable means 70.

Sleeve-mounting means 72 is provided telescopically receiving the sleeve 58 thereon for sliding movements of the sleeve 58 with respect to the mounting means 72, whereby the sleeve 58 can move on the mounting means 72 toward and away from seating relationship with the annular valve seat 44.

The sleeve 58 has a close slidable fit with respect to the mounting means 72, whereby the sleeve 58 has a covering relationship with respect to the mounting means 72. First and second abutting means 90 and 92 are provided on the valve and on the mounting means 72 respectively, the first and second abutting means being, for example, an inner side surface 96 of the valve head and an outermost terminal end 98 of the mounting means 72, the said first and second abutting means 90 and 92 being adapted to abut one another to stop movement of the valve 50 away from the valve seat 44 at times when the valve 50 has reached an innermost position shown in FIGURE 3.

Figure 3:
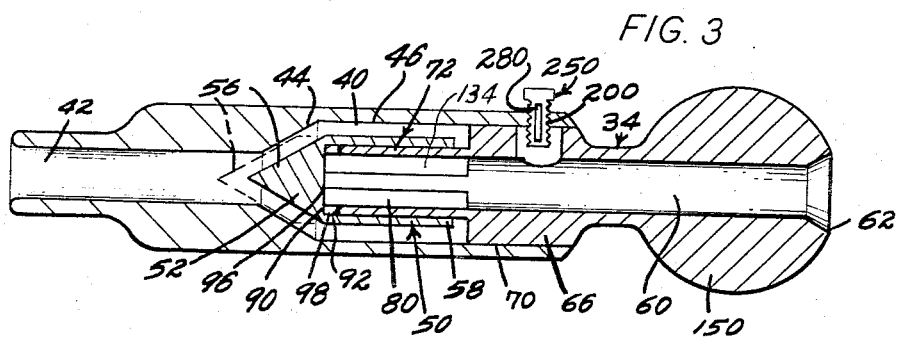
FIGURE 3 is a vertical sectional view of the valving assembly of FIGURE 2.
Figures 4, 5:
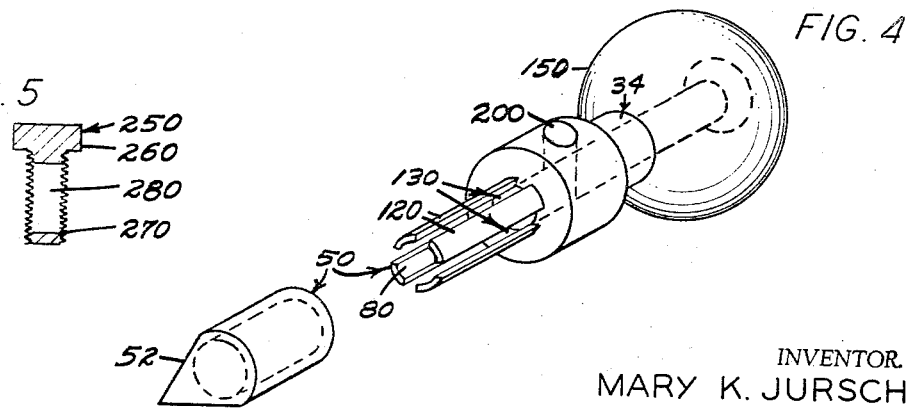
FIGURE 4 is a perspective view of portions of the valving assembly.
FIGURE 5 is a vertical sectional view taken through a pressure relief valve member of the invention.

The valve-mounting means 72 preferably comprises a plurality of horizontally extending spaced apart posts 120, as seen in FIGURE 4, and between the posts 120 is a certain opening means 130 comprising a plurality of slots 134 which extend through the valve-mounting means 72 from the chamber 40 to the outlet passage extension 80, the construction being such that the slots 134 of the certain opening means 130 are at least partially uncovered by the sleeve 58 at times when the valve 50 is in the innermost position shown in FIGURE 3, whereby when air is flowing inwardly of the input housing 32, the air can always flow through the output passage 60, the amount of the area of the certain opening means 130 defined by the slots 134 which remains uncovered by the sleeve 58 when the valve is in the innermost position, shown in FIGURE 3, being sufficiently small that upon a cessation of inflow of air through the input passage 42 and upon a commencement of flow of air inwardly through the outlet passage 60 from its outer end 62 and, therefore, through the certain opening means 130, a sufficient air force will also engage the inner side of the valve head 52 as to cause the valve to telescopically slide into seating position, as shown in dotted lines in FIGURE 3.

It is preferable that the output housing 34 have an outer end section 150, which latter is enlarged so that when the neck 20 of a balloon is received thereover, the balloon will tend to remain on the enlarged portion 150 wtihout being manually held, and will tend to stay on even when the balloon is inflated.

A pressure dissipation passage 200 extends through the housing assembly 12 and specifically through its separate housing parts, the output housing 34 and the input housing 32. That portion of the pressure dissipation passage 200 which extends through the input housing 32 is preferably threaded, and in accordance with this invention, an adjustable pressure relief valve 250 is mounted in the pressure dissipation passage 200, the valve 250, as best seen in FIGURE 5, having a manually engageable head 260, and a bolt portion 270, which latter is threaded on its exterior for fitting against threads in the input housing 32 at the passage 200. The bolt portion 270 has a transverse slot extending horizontally therethrough, the slot being numbered 280, whereby by utilizing the vertical elongation of the slot 280 in desired fashion and in the position shown in FIGURE 3, air can flow through that portion of the slot which is exposed on the inner side of the housing 32, through the slot, and out through that part of the slot 280 which is open to the atmosphere on the outer side of the housing 32, and it will be seen that by screwing the valve 250 inwardly, a lesser amount of the slot 280 will be exposed to the atmosphere, whereby a variable and regulatable shutting of flow through the slot 280 and thereby through the dissipation passage 200 is achieved.

As thus described, it will be seen that this invention has fulfilled the objectives above set forth.

From the foregoing description, it is thought to be obvious that a pressure exhaling exercising device constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

1. A valving assembly for a pressure exhaling lung exercising device comprising: a housing assembly comprising an input housing and an output housing, said input housing having a chamber therein, said input housing having an input passage from the outside into said chamber, an annular valve seat surrounding said input passage and forming a part of the wall of said chamber, a valve in said chamber and having a valve head having an outer surface adapted to seat against said valve seat to close said input passage, said valve having an annular substantially closed guide sleeve on the side of its valve head which faces away from said valve seat and attached to said valve head in a manner for providing therewith a caplike enclosure, said output housing having an output passage therethrough, said output housing having an inner end forming an end of said chamber and being secured to said input housing, sleeve-mounting means attached to one of said housings and telescopically receiving said sleeve thereon for sliding movements of said sleeve with respect to said mounting means whereby said sleeve can move on said mounting means toward and away from seating relationship with said annular valve seat, said sleeve having a close slidable fit with respect to said mounting means whereby said sleeve has a covering relationship with respect to said mounting means, said output passage extending through said mounting means whereby air in said output passage has access to the inner side of said valve head, first and second abutting means on said valve and on said mounting means respectively, said first and second abutting means being adapted to abut one another to stop movement of said valve away from said valve seat at times when said valve has reached an innermost position, said valve mounting means having an opening means extending therethrough from said chamber to said output passage, said opening means being at least partially uncovered by said sleeve when said valve is in said innermost position, whereby when air is flowing inwardly of said input housing, the air can always flow through said outlet passage, the amount of the area of said opening means which remains uncovered by said sleeve when said valve is in said innermost position being sufficiently small that upon a cessation of inflow of air through said input passage and upon a commencement of flow of air inwardly through said output passage and through said opening means, a sufficient air force will also engage the inner side of said valve head as to cause said valve to telescopically slide into seating position, and a pressure dissipation passage extending through said housing assembly from its outer side to said output passage, whereby, by blocking said dissipation passage varying amounts, various amounts of air pressure in said output passage can be relieved.

2. The valving assembly of claim 1 in further combination with a flexible elastic balloon having an annular neck portion, said neck portion being disposed around one of said housings in a manner for disposing the inner end of said outlet passage in said balloon and said inlet passage outside of said balloon.

3. The combination of claim 1 in which an adjustable pressure relief valve is in said pressure dissipation passage.

References Cited

UNITED STATES PATENTS

| | | | |
|---|---|---|---|
| 737,008 | 8/1903 | Nichol | 272—57 |
| 856,432 | 6/1907 | Thomson | 272—57 |
| 2,289,946 | 7/1942 | Weatherhead | 137—543.15 |
| 2,459,664 | 1/1949 | Majneri | 137—102 |
| 2,792,669 | 5/1957 | Jackson et al. | 46—90 |

FOREIGN PATENTS

| | | |
|---|---|---|
| 55,159 | 8/1938 | Denmark. |

RICHARD C. PINKHAM, *Primary Examiner.*